United States Patent
Baker

(10) Patent No.: US 11,501,164 B2
(45) Date of Patent: Nov. 15, 2022

(54) COMPANION ANALYSIS NETWORK IN DEEP LEARNING

(71) Applicant: D5AI LLC, Maitland, FL (US)

(72) Inventor: James K. Baker, Maitland, FL (US)

(73) Assignee: D5AI LLC, Maitland, FL (US)

(*) Notice: Subject to any disclaimer, the term of this patent is extended or adjusted under 35 U.S.C. 154(b) by 103 days.

(21) Appl. No.: 16/620,177

(22) PCT Filed: Aug. 8, 2019

(86) PCT No.: PCT/US2019/045653
§ 371 (c)(1),
(2) Date: Dec. 6, 2019

(87) PCT Pub. No.: WO2020/033645
PCT Pub. Date: Feb. 13, 2020

(65) Prior Publication Data
US 2021/0342683 A1 Nov. 4, 2021

Related U.S. Application Data

(60) Provisional application No. 62/716,683, filed on Aug. 9, 2018.

(51) Int. Cl.
*G06N 3/08* (2006.01)
*G06N 3/04* (2006.01)

(52) U.S. Cl.
CPC .............. *G06N 3/08* (2013.01); *G06N 3/0454* (2013.01)

(58) Field of Classification Search
CPC ................................ G06N 3/08; G06N 3/0454
See application file for complete search history.

(56) References Cited

U.S. PATENT DOCUMENTS 5,636,326 A * 6/1997 Stork .................... G01N 33/005
706/25
6,128,606 A * 10/2000 Bengio ................. G06K 9/4628
706/10

(Continued)

FOREIGN PATENT DOCUMENTS

WO  WO 2018/175098 A1  9/2018
WO  WO 2018/194960 A1  10/2018

(Continued)

OTHER PUBLICATIONS

Sirignano et al., "DGM: A deep learning algorithm for solving partial differential equations", 2018. Available online at arxiv.org on Jul. 2018. (Year: 2018).*

(Continued)

*Primary Examiner* — Omar F Fernandez Rivas
*Assistant Examiner* — Selene A. Haedi
(74) *Attorney, Agent, or Firm* — K&L Gates LLP

(57) ABSTRACT

Systems and methods analyze training of a first machine learning system with a second machine learning system. The first machine learning system comprises a neural network with a first inner layer node. The method includes connecting the first machine learning system to an input of the second machine learning system. The second machine learning system comprises a second objective function for analyzing an internal characteristic of the first machine learning system and which is different from a first objective function for the first machine learning system. The method further includes providing a training data item to the first machine learning system, collecting internal characteristic data from the first inner layer node of the first machine learning system associated with the internal characteristic, computing partial derivatives of the first objective function through the first machine learning system with respect to the training data item, and computing partial derivatives of the second objec- (Continued)

tive function through both the second machine learning system and the first machine learning system with respect to the collected internal characteristic data.

42 Claims, 4 Drawing Sheets

(56) References Cited

U.S. PATENT DOCUMENTS

| | | | |
|---|---|---|---|
| 6,473,746 | B1 | 10/2002 | Zakrzewski |
| 10,586,151 | B1* | 3/2020 | Teig .................... G06N 3/0481 |
| 2007/0094168 | A1 | 4/2007 | Ayala et al. |
| 2016/0026914 | A1 | 1/2016 | Yu et al. |
| 2016/0092794 | A1 | 3/2016 | Qian et al. |
| 2016/0110657 | A1* | 4/2016 | Gibiansky .............. G06N 20/00 706/12 |
| 2016/0155049 | A1* | 6/2016 | Choi ...................... G06N 3/082 706/16 |
| 2018/0240010 | A1* | 8/2018 | Faivishevsky ....... G06N 3/0454 |
| 2019/0095798 | A1 | 3/2019 | Baker |
| 2019/0236445 | A1* | 8/2019 | Das .......................... G06N 3/08 |

FOREIGN PATENT DOCUMENTS

| | | |
|---|---|---|
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

International Search Report and Written Opinion for International PCT Application No. PCT/US2019/045653 dated Nov. 4, 2019.
Carlsson et al., Using Topological Data Analysis to Understand the Behavior of Convolutional Neural Networks, Artificial Intelligence, Machine Intelligence, Machine Learning (Jun. 21, 2018), pp. 1-8.

* cited by examiner

COMPANION ANALYSIS NETWORK IN DEEP LEARNING

PRIORITY

The present application is a national stage application under 35 U.S.C. § 371 of PCT application Serial No. PCT/US19/45653, filed Aug. 8, 2019, which claims priority to U.S. Provisional Patent Application Ser. No. 62/716,683, filed Aug. 9, 2018, both having the same title and inventor are indicated above, and both of which are incorporated herein by reference.

BACKGROUND

In recent years, there has been remarkable progress in artificial intelligence with machine learning systems, especially deep learning systems based on neural networks, achieving or surpassing human-level performance on a number of tasks. However, despite their success, these systems lack introspection and therefore have no understanding or intuition about their own behavior. This problem is aggravated by the fact that it is also often very difficult for human developers and researchers to understand the inner workings of these complex systems.

SUMMARY

The invention described herein, in one general aspect, uses a second machine learning system to analyze the internal properties and behavior of a first machine learning system. The task of the second machine learning is not to replace or supplement the first machine learning system doing the same task as the first machine learning system. Rather, the task of the second machine learning system is to understand the first machine learning system and to make that knowledge available to human users and other systems. Computed properties of the first machine learning system, such as node activations and partial derivatives of a training objective and other functions are collected and made available as input to the second machine learning system. The second machine learning system is trained to optimize a specified analysis objective, and it also may back propagate the derivatives of that analysis objective to the first machine learning system. With the back propagation from the second machine learning system, the first machine learning system trains on the analysis objective of the second machine learning system as a secondary objective in addition to its primary objective. Thus, the first machine learning system learns to provide information that helps the second machine learning system perform computations that better satisfy the analysis objective. The analysis objective of the second machine learning system may specify an output that is more easily human interpretable, so the invention not only provides a form of introspection for the machine learning systems, it also facilitates human understanding. These and other potential benefits of the present invention will be apparent from the description that follows.

FIGURES

Various embodiments of the present invention are described herein by way of example in conjunction with the following figures.

DETAILED DESCRIPTION

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 2:
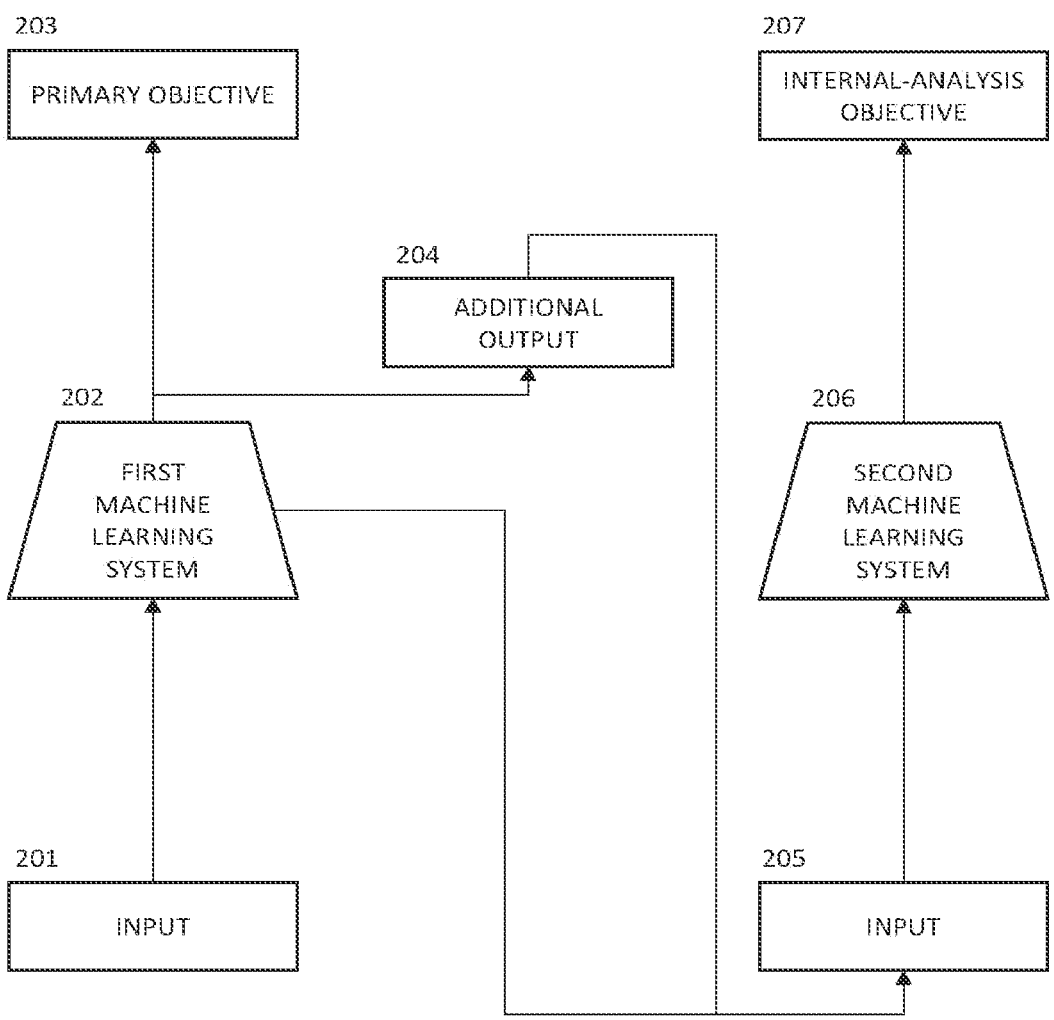
FIG. 2 is a system diagram of an illustrative embodiment of the invention.
Figure 3:
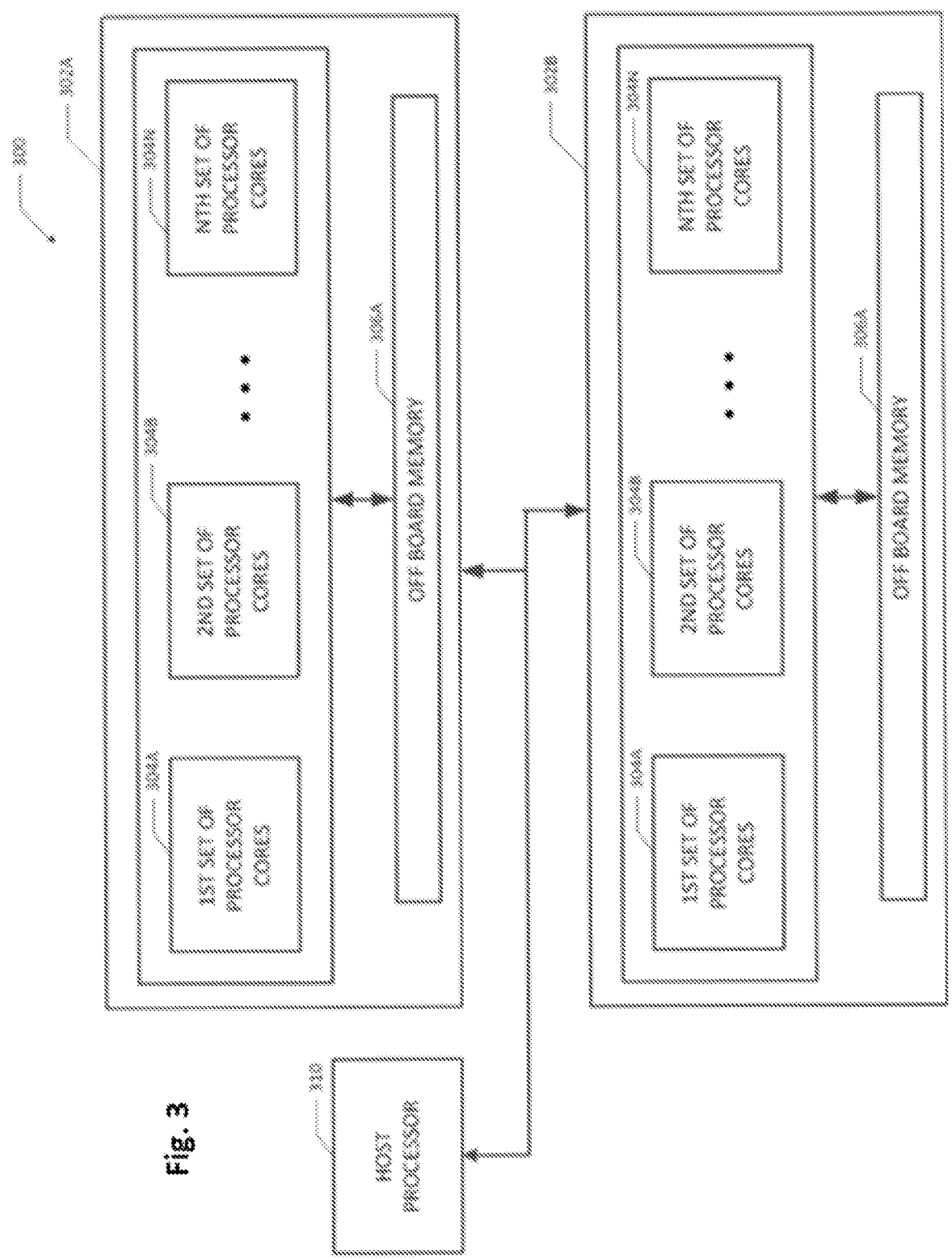
FIG. 3 is an illustrative diagram of a computer system that may be used to implement various embodiments of the invention.
Figure 4:
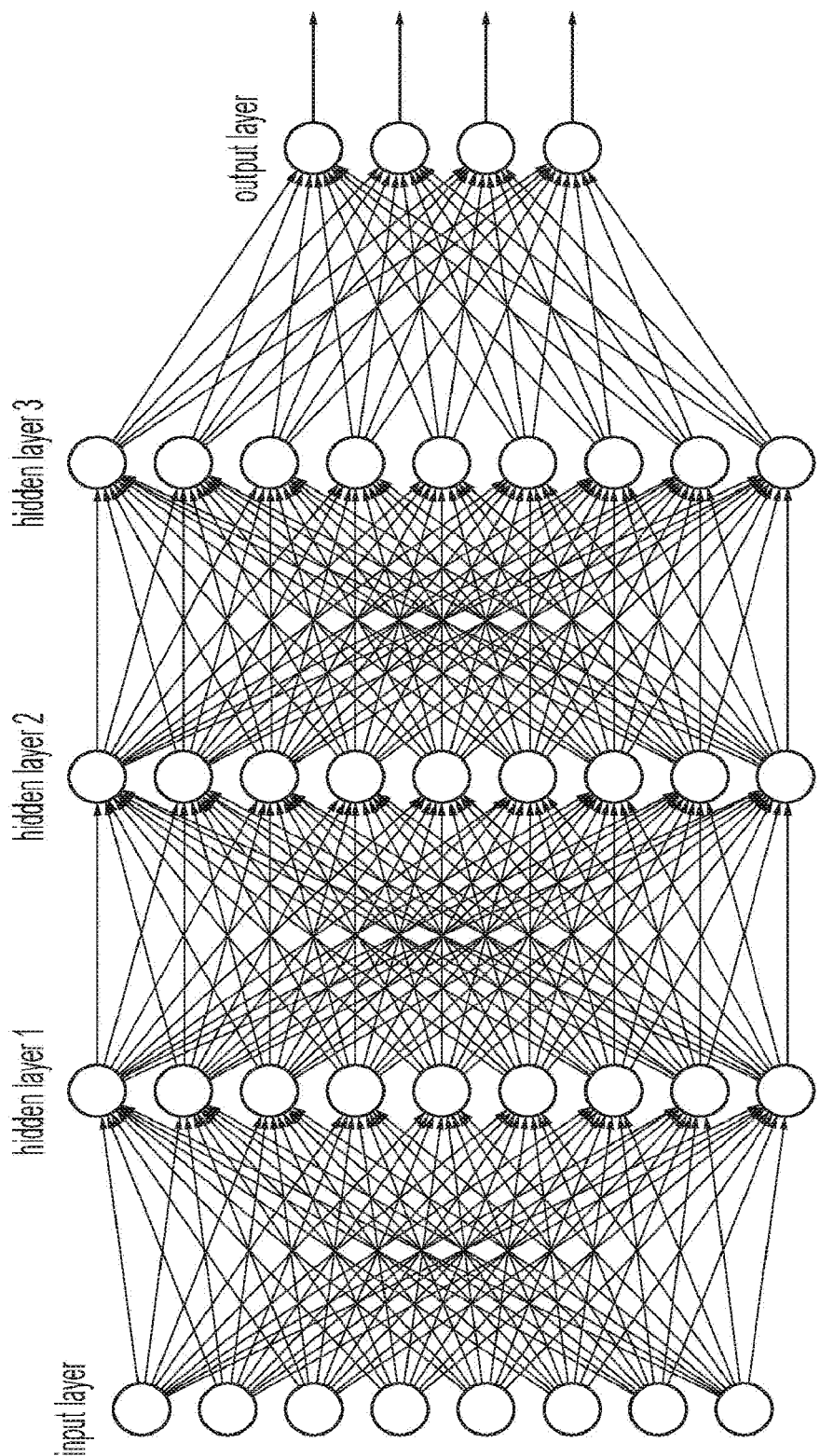
FIG. 4 is a drawing of an example of a neural network such as might be used in various aspects of various embodiments of the invention.

In an illustrative embodiment, a computer system, such as the computer system 300 illustrated in FIG. 3, collects internal data during the training or operation of a first machine learning system (such as the first machine learning system 202 in FIG. 2) and provides that data to a second machine learning system (such as the second machine learning system 206 in FIG. 2) to analyze the provided data for various purposes. In one aspect, the first and second machine learning systems can be trained by stochastic gradient descent based on back propagation to compute partial derivatives of their respective objectives. For example, the first machine learning system 202 and the second machine learning system 206 may both be neural networks, an example of which is illustrated in FIG. 4.

A common method for training a neural network is an iterative procedure called "stochastic gradient descent" with an update in the learned parameters done for each minibatch of training data items with an estimate of the gradient computed for each training data item by a feed forward activation computation followed by a back propagation computation of the derivatives of an objective function with respect to the activations of the nodes of the network and with respect to the weights associated with the arcs of the network.

Figure 1:
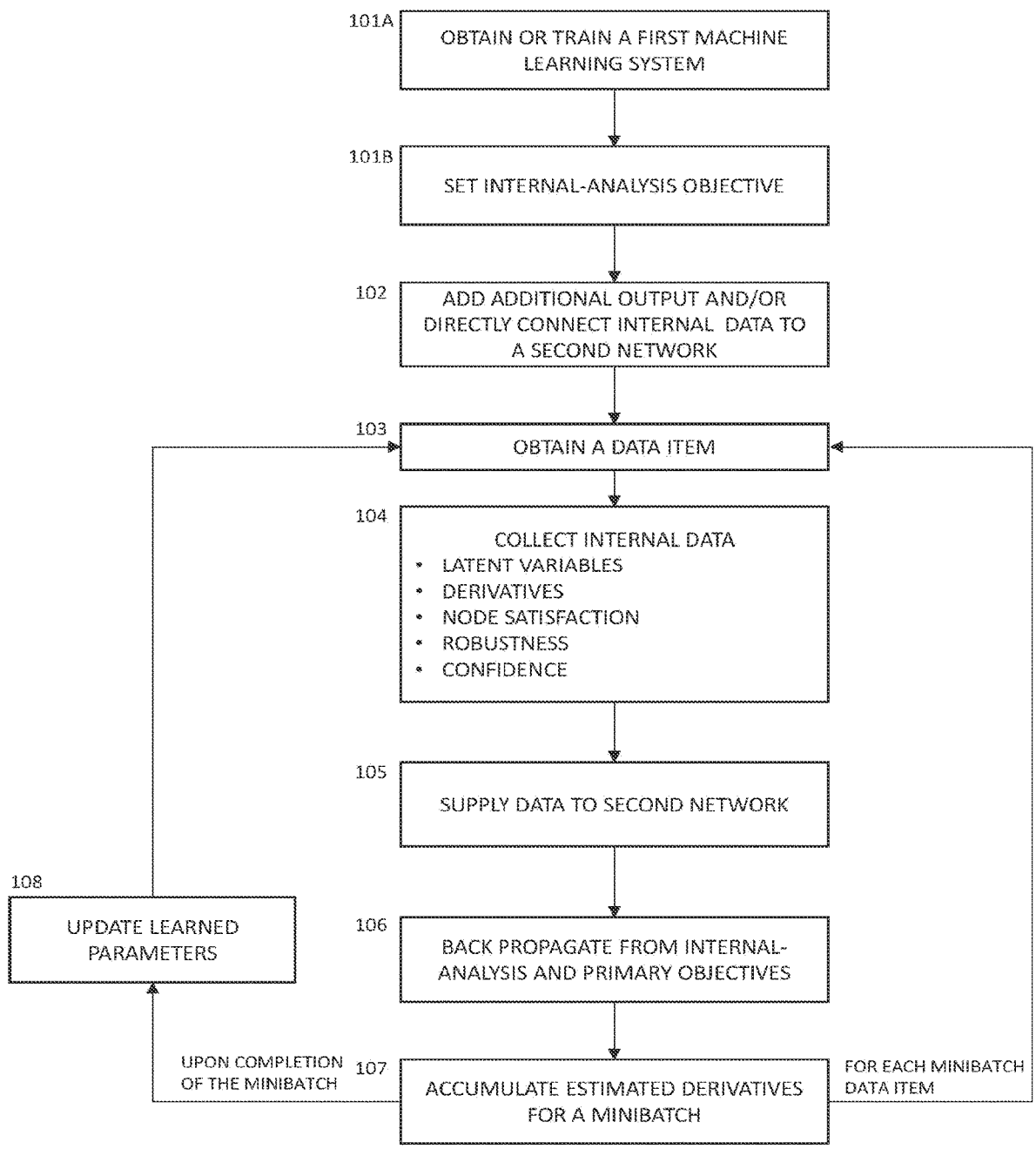
FIG. 1 is a flowchart of a process executed by a computer system in various embodiments of the invention disclosed herein.

By way of illustration of the general principles, some of the detailed descriptions of FIGS. 1 and 2 are in terms of embodiments using neural networks. However, in various embodiments, similar methods may be applied to other types of machine learning systems that can be trained by stochastic gradient descent. For example, mixture of Gaussian distribution with no limit on the number of components is a universal approximator that can be trained using the EM algorithm or gradient descent. The number of parameters is proportional to square of the number of input variables times the number of components in the mixture. With a very large number of parameters, gradient descent or stochastic gradient descent may be more efficient than the EM algorithm. With a very large amount of data, stochastic gradient descent will be more computationally efficient than full batch gradient descent. In some embodiments, similar methods may be applied to any machine learning system for which it is possible to compute or estimate derivatives of an objective function with respect to the input values and/or with respect to internal elements of the machine learning system. In some embodiments, the training method does not need to be supervised learning based on stochastic gradient descent. For example, the training may be unsupervised learning.

FIG. 1 is a flow chart of a process executed by a computer system, such as the computer system 300 in FIG. 3, in various embodiments. The discussion of the steps in FIG. 1 refers to elements in the system diagram of an illustrative embodiment in FIG. 2. It should be noted that the directionality of each arrow in FIG. 2 indicates the direction in which a feed forward computation is performed; conversely, the opposing direction for each arrow corresponds to the direction of a back propagation computation. Further, the machine learning systems and the process described in connection with FIGS. 1 and 2 can be embodied as computer-executable instructions stored in a memory of a computer system, such as the computer system 300 illustrated in FIG. 3, that, when executed by a processor, cause the computer system 300 to perform the described steps.

In an illustrative embodiment, in step 101A of FIG. 1, the computer system 300 trains a machine learning system or obtains a pre-trained machine learning system, which is presented by the first machine learning system 202 in FIG. 2. The first machine learning system 202 may be a neural network. The computer system 300 can obtain a pre-trained machine learning system by generating the machine learning system or receiving data embodying the pre-trained machine learning system from an external source (e.g., another computer system).

In step 101B, the computer system 300 sets an objective 207 for a second machine learning system 206. The second machine learning system 206 may also be a neural network. The objective 207 can be referred to as a second or "internal-analysis" objective 207. The internal-analysis objective 207 is the objective in training the second machine learning system 206 and, along with the primary objective 203, is a second objective in further training of the first machine learning system 202 in the loop from step 103 to step 108 of FIG. 1.

In step 102, the computer system 300 connects the first machine learning system 202 to an input 205 of the second machine learning system 206. The computer system 300 can connect the first machine learning system 202 to the input 205 in a variety of different manners, including adding additional output nodes 204 to the first machine learning system 202 that are connected to the input 205 of the second machine learning system 206 and/or providing direct connections between internal elements (i.e., the internal nodes in aspects when the first machine learning system 202 is a neural network) in the first machine learning system 202 and the input 205 of the second machine learning system 206. The activation values of these additional output nodes 204 and of the original output nodes are provided as input to a second machine learning system 206, as indicated by the arrows from the first machine learning system 202 and the additional output 204 to the internal-analysis input 205 of the second machine learning system 206. If the first machine learning system 202 is a neural network, then activation values of inner layer nodes of first machine learning system 202 may also be directly provided as input to the second machine learning system 206, as indicated by the arrow from the first machine learning system 202 to the internal-analysis input 205.

Some embodiments use only additional output nodes 204 and no direct connections between internal elements of the first machine learning system 202 and the input 205 of the second machine learning system 206. Some embodiments use only direct connections without any additional output nodes 204. Still other embodiments use both direct connections and additional output nodes 204, such as the embodiment illustrated in FIG. 2. An advantage of an embodiment with additional output nodes 204 is that additional computation can be done by layers of the neural network between a useful internal element and an output node whose activation is based in part on activation fed forward from the useful internal element. On the other hand, there may be a large number of internal element values to be passed and it might be inefficient to represent each of them with a dedicated output node, so some embodiments may use both methods of communication.

In step 103, the computer system 300 obtains an item of data. During training, the computer system 300 also obtains a corresponding label or target value for the data item and sets the value of the primary objective 203. During operation, in some embodiments, the computer system 300 performs semi-supervised learning and sets a value for the primary objective 203 and/or for the analysis objective 207.

In step 104, the computer system 300 collects various kinds of internal data associated with the first machine learning system 202. In various embodiments, the computer system 300 collects the value of one or more latent variables. If the first machine learning system 202 is a neural network, the collected latent variables may include the activation values of inner layer nodes.

In some embodiments, in step 104, the computer system 300 computes and collects the values of one or more derivatives. For example, if the first machine learning system 202 is a neural network, the computer system 300 may compute the partial derivative of the primary objective 203 with respect to any of the following: (i) the activation value of a node, (ii) the input to a node, or (iii) the connection weight associated with an arc in the network. The information collected by the computer system 300 in step 104 may be used in the second network 206 to compute properties of the first network 202 that may be more easily used by an external machine learning system or that may be more easily interpreted by a human user.

For example, the computer system 300 may compute a node "satisfaction score" for a node in the first machine learning system 202 for a training data item, doing the computation in higher layers of the first machine learning system 202 or in the second machine learning system 206. For example, if the activation function of node n is a sigmoid function, its satisfaction score may be defined as sat(n)=sign (A(n)−0.5)*sign(−δ(n)), where A(n) is the output activation of node n for the training data item, and δ(n) is the derivative of the primary objective 203 with respect to the output activation of node n. The function sat(n) may be computed in higher layers of the first machine learning system 202 or in the second machine learning system 206 by a combination of nodes with a sign(x) activation function and a multiply node. If sat(n)>0, then a stochastic gradient descent update based on the training data example would try to increase the magnitude of the quantity (A(n)−0.5). That is, the update would try to increase the absolute magnitude of the input of the node, moving it away from the neutral point 0.0. If sat(n)<0, the update would decrease the magnitude of the input to node n. That is, the update would try to change the network in a direction toward flipping sign(A(n)−0.5) from 1 to −1 or vice versa. Thus, sat(n)<0 is an indication that the update is trying to push node n in the direction of changing its "state." In this situation, node n is said herein to be "unsatisfied" for the training data item. If sat(n)>0, the node is said to be "satisfied" for the training data item.

In step 104, the computer system 300 may compute in the second machine learning system 206 the satisfaction score of any node in the first machine learning system 202 and, in additional layers of the second machine learning system 206, may compute any desired function or interpretation of the satisfaction scores of the nodes of the first machine learning system 202, as specified by the internal-analysis objective 207. The output of the second machine learning system 206 is then available for use by an external machine learning system or by a human user. Knowing which nodes are unsatisfied for a data item may help an external system or a human user to take corrective action, for example, by creating a new ensemble member trained with greater emphasis on the data item.

In some embodiments, in step 104, on training data, the computer system 300 may compute and collect partial derivatives of some quantity other than the loss function of the primary objective 203. For example, the computer system 300 may compute partial derivatives of the difference between the correct answer and the best scoring incorrect answer. With these partial derivatives, the computer system 300 may compute in the second machine learning system 206 an estimate of the likelihood of the first machine learning system 202 making an error due to a change in the input 201 or a change in one of the elements in the first machine learning system 202. This estimate of vulnerability may be used by an external machine learning system or by a human developer as an indication of how to increase the robustness of the classification by the first machine learning system 202.

In some embodiments, in step 104, the computer system 300 may compute partial derivatives of a function that does not depend on knowing the correct or target output. In these embodiments, the partial derivatives may be computed even during unsupervised training or during operational recognition of unlabeled data. As an example, the computer system 300 may compute the partial derivatives of the difference between the maximum activation of any output node and the second largest activation value of any output node. With the partial derivatives in this example, the computer system 300 may compute in the second machine learning system 206 a score indicating the degree of "confidence" in the output computed by the first machine learning system 202. This confidence score can be used by an external machine learning system or by a human user similarly to as is described above.

In an embodiment that computes derivatives and passes them as data in the activation of other nodes, either in the second machine learning system 206 or within the first machine learning system 202, the stochastic gradient estimation computation may use a double computation process. There may be a first-round feed forward activation of the first machine learning system 202 followed by a back propagation in the first machine learning system 202 to compute partial derivatives of the primary objective 203. Then there may be a second-round feed forward computation and another back propagation computation. The second-round feed forward computation could use activations and derivatives computed in the first round and may feed second-round activations across the connections from the first machine learning system 202 and the additional output nodes 204 to the input 205 and from there throughout the second machine learning system 206. The second-round back propagation computes derivatives of the internal-analysis objective 207. The second-round back propagation may back propagate derivatives of the internal-analysis objective 207 through the input 205 back to the first machine learning system 202. The output of the second machine learning system 206 and its objective 207 may be designed to make the output of the first machine learning system 202 more easily understood both by other machine learning systems and by humans. Thus, with this second back propagation, the first machine learning system 202 may be trained to support its own internal analysis and to make this information available and interpretable through the output of the second machine learning system 206.

In embodiments that compute derivatives of the primary objective 203 for use as data for a second-round computation, it may be preferred for no node in the first machine learning system 202 that receives derivatives as data in the second-round feed forward activation to have a feed forward connection along a path to the primary objective 203. In this embodiment, the subnetwork between a derivative node and the additional output nodes 204 is only trained by back propagation from second (i.e., internal-analysis) machine learning system 206. If the additional output nodes 204 are only connected to one second (i.e., internal-analysis) machine learning system 206, then the subnetwork could equivalently be a subnetwork of the second machine learning system 206 instead of being a subnetwork of the first machine learning system 202. In some embodiments, there may be a plurality of internal-analysis machine learning systems, which may have different objectives, such as the examples mentioned in step 104 of FIG. 1. In that case, a subnetwork within the first machine learning system 202 shares back propagation from all the internal-analysis machine learning systems. An embodiment in which no derivative node has a feed forward connection to the primary objective 203 avoids creating a cycle of dependency in the computation of the activations.

In another embodiment, such a cycle is allowed, creating a recurrent machine learning system (e.g., a recurrent neural network). This recurrent machine learning system may then be approximated by, for example, an unrolled feed forward neural network. The procedure of unrolling a recurrent neural network to a feed forward neural network is well-known to those skilled in the art of training recurrent neural networks.

More details about the use of derivatives as data is explained in PCT Application No. PCT/US2019/035300, filed Jun. 4, 2019, entitled "USING BACK PROPAGATION COMPUTATION AS DATA," which is incorporated herein by reference in its entirety.

In some embodiments, in step 104, the computer system 300 collects information about aspects of the performance other than the performance on the primary objective 203. For example, during training, the computer system 300 may collect information on the progress of the training procedure. As a more specific example, the computer system 300 may compare an activation value or a derivative for a data item to the value of the activation or derivative for the same data item in a previous epoch of training. As another example, the computer system 300 may compute the correlation of the activation of a first node with the partial derivative of the primary objective 203 with respect to the activation of a second node. This correlation may be useful for making decisions to add an arc to, or delete an arc from, a network.

In step 105, the computer system 300 supplies the data collected in step 104 to a second machine learning system 206, either by a direct connection such as from the second machine learning system 206 to the input block 205 or by way of additional layers of the first machine learning system 202 to the additional output nodes 204 and then to input block 205.

In step 106, the computer system 300 computes partial derivatives of the primary objective 203 and of the internal-analysis objective 207 by back propagation or by numerical estimation. The back propagation computation is an implementation of the chain rule of calculus. It is the preferred method if the machine learning systems 202, 206 are neural networks and is well-known to those skilled in the art of training neural networks. For other machine learning system types, a partial derivative may be numerically estimated by evaluating a function at two input values that differ only by a small increment in one variable. The difference in the function values is then divided by the increment to estimate the partial derivative.

Various internal-analysis objectives 207 are used in various embodiments. For example, the task of the analysis machine learning system 206 may be to predict the reliability of the first machine learning system 202 on a case-by-case basis. As another example, the task of the analysis machine learning system 206 may be to increase the robustness of the first machine learning system 202 against variations in the input 201, in which case the internal-analysis objective 207 may be to minimize some norm of the partial derivatives of primary objective 203 of the first machine learning system 202 with respect to the input values 201. As a third example, the first machine learning system 202 may be a member of an ensemble, and the task of the analysis machine learning system 206 may be to evaluate the diversity of the first machine learning system 202 relative to the other members of the ensemble. As a fourth example, the task of the analysis machine learning system 206 may be to detect during the learning process that learning progress is slow because the first machine learning system 202 is approaching a local minimum or a saddle point. In such a case, the computer system 300 may take remedial action such as adjusting a hyperparameter or making a change in the architecture of the first machine learning system 202.

In some embodiments, a system developer may directly specify an analysis objective 207 that will make available analysis information that is needed by the system developer or another user or another machine learning system.

In some embodiments, the partial derivative for the analysis objective 207 may be back propagated backwards through the second machine learning system 206 to the input 205 and then backwards into the first machine learning system 202, either directly or by way of the additional output nodes 204. Within the first machine learning system 202, the partial derivatives of the primary and internal analysis objectives 203, 207 are combined by a weighted average in which each objective is multiplied by its respective learning rate. Each learning rate is a hyperparameter that may be tuned to the given task.

In the illustrative embodiment of FIG. 1, the training is an iterative process that performs multiple passes through the training data. Each pass through the training data is called an epoch. Generally, for each epoch, the training data is divided into a set of minibatches. In step 107, the computer system 300 accumulates the partial derivative estimates for each of the objectives, returning to step 103 for additional data items until the accumulation for the minibatch is complete. The vector of these partial derivatives of the objectives is called the gradient.

Once the accumulation of partial derivative estimates for a minibatch is complete, the computer system 300 proceeds to step 108. In step 108, the computer system 300 updates the learned parameters by stochastic gradient descent. That is, the computer system 300 updates each learning parameter by a vector increment in the direction of the negative of the accumulated estimated gradient for the minibatch. Various well-known modifications to simple stochastic gradient descent, such as momentum, dropout, and block normalization may be applied. Training by stochastic gradient descent and these modifications are well-known to those skilled in the art of training neural networks.

After an update to the learned parameters, the computer system 300 can return to step 103 to process another minibatch. If all minibatches for an epoch have been processed, the computer system 300 can return to step 103 to begin a new epoch. The computer system 300 can continue the process illustrated in FIG. 1 until a stopping criterion has been reached. For example, a stopping criterion may be any of the following: (i) the iterative training has converged, (ii) the performance on an independent set of validation data has dropped by more than a specified tolerance, or (iii) a specified maximum number of epochs has been reached.

FIG. 3 is a diagram of a computer system 300 that could be used to implement the embodiments described above, such as the process described in FIG. 1. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the first machine learning system 202 and the second processor unit 302B may implement machine learning system 206. As another example, another multiple processor unit 302C may implement an external machine learning system that receives the output of network 206 as input. Further, different sets of cores in the first and/or second processor unit 302A, 302B may be responsible for different subnetworks in the machine learning systems 202, 206 or different ensemble members where the machine learning systems 202, 206 comprise an ensemble. In some embodiments, machine learning system 202 or machine learning system 206 may be a form of machine learning system other than a neural network. One or more host processors 310 may coordinate and control the processor units 302A-B. The process depicted in FIG. 1 can be embodied as a set of instructions stored within a memory (e.g., an integral memory of the processing units 302A, 3028 or an off board memory 306A couple to the processing units 302A, 302B or other processing units) coupled to one or more processors (e.g., at least one of the sets of processor cores 304A-N of the processing units 302A, 302B or another processor(s) communicatively coupled to the processing units 302A, 302B), such that, when executed by the one or more processors, the instructions cause the processors to perform the aforementioned process by, for example, controlling the machine learning systems 202, 206 stored in the processing units 302A, 302B.

In other embodiments, the computer system 300 could be implemented with one processor units. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python®, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java®, Lisp, Pascal, Object Pascal, Haskell, ML; and examples of scripting languages include Bourne script, JavaScript®, Python®, Ruby, Lua®, PHP, and Perl®.

Unless specifically stated otherwise as apparent from the foregoing disclosure, it is appreciated that, throughout the foregoing disclosure, discussions using terms such as "computing," "calculating," "determining," "selecting," or the like, refer to the action and processes of a computer system (e.g., the computer system 300 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

FIG. 4 is a drawing of an example of a feed forward neural network. In this discussion, a neural network comprises a network of nodes organized into layers, a layer of input nodes, zero or more inner layers of nodes, and a layer of output nodes. There is an input node associated with each input variable and an output node associated with each output variable. An inner layer may also be called a hidden layer. A given node in the output layer or in an inner layer is connected to one or more nodes in lower layers by means of a directed arc from the node in the lower layer to the given higher layer node. A directed arc may be associated with a trainable parameter, called its weight, which represents the strength of the connection from the lower node to the given higher node. A trainable parameter is also called a "learned" parameter. Each node is also associated with an additional learned parameter called its "bias." In some embodiments, there are additional elements not illustrated in FIG. 4. Other parameters that control the learning process are called "hyperparameters." The neural network illustrated in FIG. 4 has an input layer, an output layer, and three hidden layers.

Based on the above description, it is clear that embodiments of the present invention can be used to improve many different types of machine learning systems, particularly neural networks. For example, embodiments of the present invention can improve recommender systems, speech recognition systems, and classification systems, including image and diagnostic classification systems, to name but a few examples.

Various aspects of the subject matter described herein are set out in the following aspects, implementations, and/or examples, which can be interchangeably combined together in various combinations:

In one general aspect, a computer-implemented method for analyzing a first machine learning system via a second machine learning system, the first machine learning system comprising a first objective function, the method comprising: (i) connecting, by a computer system, the first machine learning system to an input of the second machine learning system; wherein the second machine learning system comprises a second objective function for analyzing an internal characteristic of the first machine learning system; (ii) providing, by the computer system, a data item to the first machine learning system; (iii) collecting, by the computer system, internal characteristic data from the first machine learning system associated with the internal characteristic; (iv) computing, by the computer system, partial derivatives of the first objective function through the first machine learning system with respect to the data item; and (v) computing, by the computer system, partial derivatives of the second objective function through both the second machine learning system and the first machine learning system with respect to the collected internal characteristic data.

In one aspect, connecting the first machine learning system to the second machine learning system comprises: (i) adding, by the computer system, an additional output node to the first machine learning system; and (ii) connecting, by the computer system, the additional output node to an input of the second machine learning system.

In one aspect, connecting the first machine learning system to the second machine learning system comprises: connecting, by the computer system, an internal element of the first machine learning system to an input of the second machine learning system.

In one aspect, the first machine learning system comprises a neural network and the internal element comprises a node of the neural network.

In one aspect, the internal characteristic data comprises a latent variable.

In one aspect, the first machine learning system comprises a neural network comprising an inner node; and the latent variable comprises an activation value of the inner node.

In one aspect, the internal characteristic data comprises a derivative calculated with respect to a parameter of the first machine learning system.

In one aspect, the first machine learning system comprises a neural network comprising a plurality of output nodes; and the derivative comprises a partial derivative of a difference between a largest activation and a second largest activation of the plurality of output nodes for the data item.

In one aspect, the first machine learning system comprises a neural network comprising an inner node; and the derivative comprises a partial derivative of the first objective function with respect to an activation value of the inner node.

In one aspect, the first machine learning system comprises a neural network comprising a node; and the derivative comprises a partial derivative of the first objective function with respect to an input to the node.

In one aspect, the first machine learning system comprises a neural network; the neural network comprises a first node, a second node, and an arc connecting the first node and the second node; and the derivative comprises a partial derivative of the first objective function with respect to a connection weight of the arc.

In one aspect, the first machine learning system is one of an ensemble of machine learning systems; and the derivative comprises a partial derivative of a difference between an output of the first machine learning system and a correct output of the ensemble of machine learning systems.

In one aspect, the internal characteristic data comprises a satisfaction score sat(n) defined as:

$$sat(n)=sign(A(n)-0.5)*sign(-\delta(n)),$$

where A(n) is an output activation of a node n of the first machine learning system for the data item.

In one aspect, the internal characteristic data comprises a comparison between a first value of a latent variable for a current training iteration and a second value of the latent variable for a prior training iteration of the first machine learning system.

In one aspect, the internal characteristic data comprises a comparison between a first derivative calculated with respect to a parameter of the first machine learning system for a current training iteration and a second derivative calculated with respect to the parameter of the first machine learning system for a prior training iteration of the first machine learning system.

In one aspect, the first machine learning system comprises a first neural network and the second machine learning system comprises a second neural network.

In one aspect, computing partial derivatives of the first objective function and computing partial derivatives of the second objective function each comprise performing a back propagation calculation.

In one aspect, computing partial derivatives of the first objective function and computing partial derivatives of the second objective function each comprise performing a numerical estimation calculation.

In one aspect, the method further comprises updating, by the computer system, learned parameters of the first machine learning system.

In one aspect, the internal characteristic is selected to cause the second machine learning system to alter an output of the first machine learning system when updating the learned parameters of the first machine learning system.

In one aspect, a computer system comprises a processor and a memory coupled to the processor, the memory storing a machine learning system and instructions that, when executed by the processor, cause the computer system to execute the method(s) enumerated above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for analyzing training of a first machine learning system with a second machine learning system, the first machine learning system comprising a first objective function, the method comprising:
   connecting, by a computer system, the first machine learning system to an input of the second machine learning system, wherein:
      the first machine learning system comprises a first neural network;
      the first machine learning system comprises an input layer, an output layer, and one or more inner layers between the input and output layers;
      each of the one or more inner layers comprises one or more nodes, such that the first machine learning system comprises at least a first inner layer node that is on one of the one or more inner layers of the first neural network;
      the second machine learning system comprises a second objective function for analyzing an internal characteristic of the first machine learning system; and
      the second objective function is different from the first objective function; and
   iteratively training the first machine learning system through multiple iterations, wherein iteratively training the first machine learning system comprises:
      for each iteration:
         providing, by the computer system, a training data item to the first machine learning system;
         collecting, by the computer system, internal characteristic data from the first inner layer node of the first machine learning system associated with the internal characteristic of the first machine learning system for the training data item;
         computing, by the computer system, partial derivatives of the first objective function through the first machine learning system with respect to the training data item;
         computing, by the computer system, partial derivatives of the second objective function through both the second machine learning system and the first machine learning system with respect to the collected internal characteristic data for the training data item; and
         computing, by the computer system, combined partial derivatives for the first machine learning system, wherein the combined partial derivatives comprise a combination of the partial derivatives of the first objective function through the first machine learning system for the training data item and the partial derivatives of the second objective function through the first machine learning system; and after the multiple iterations:

computing, by the computer system, accumulated partial derivatives for the first machine learning system, wherein the accumulated partial derivatives are computed from the combined partial derivatives across the training data items used in the multiple iterations; and updating, by the computer system, learned parameters of the first machine learning system based on the accumulated partial derivatives.

2. The computer-implemented method of claim 1, wherein connecting the first machine learning system to the second machine learning system comprises:

adding, by the computer system, an additional output node to the first machine learning system; and connecting, by the computer system, the additional output node to the input of the second machine learning system.

3. The computer-implemented method of claim 1, wherein connecting the first machine learning system to the second machine learning system comprises:

connecting, by the computer system, an internal element of the first machine learning system to the input of the second machine learning system.

4. The computer-implemented method of claim 3, wherein the internal element comprises the first inner layer node of the neural network.

5. The computer-implemented method of claim 1, wherein the internal characteristic data from the first inner layer node comprises a latent variable.

6. The computer-implemented method of claim 5, wherein:

the latent variable comprises an activation value of the first inner layer node.

7. The computer-implemented method of claim 1, wherein the internal characteristic data from the first inner layer node comprises a derivative calculated with respect to a parameter of the first inner layer node of the first machine learning system.

8. The computer-implemented method of claim 7, wherein:

the derivative comprises a partial derivative of the first objective function with respect to an activation value of the first inner layer node.

9. The computer-implemented method of claim 7, wherein:

the derivative comprises a partial derivative of the first objective function with respect to an input to the first inner layer node.

10. The computer-implemented method of claim 7, wherein:

the neural network comprises a second node, and an arc from the second node to the first inner layer node; and the derivative comprises a partial derivative of the first objective function with respect to a connection weight of the arc.

11. The computer-implemented method of claim 1, wherein the internal characteristic data from the first inner layer node comprises a satisfaction score sat(n) defined as:

$$\text{sat}(n) = \text{sign}(A(n) - 0.5) * \text{sign}(-\delta(n)),$$

where $A(n)$ is an output activation of the first inner layer node of the first machine learning system for the data item, where "sign" represents a sigmoid function.

12. The computer-implemented method of claim 1, wherein the internal characteristic data from the first inner layer node comprises a comparison between a first value of a latent variable for the first inner layer node for a current training iteration and a second value of the latent variable for a prior training iteration of the first machine learning system.

13. The computer-implemented method of claim 1, wherein the internal characteristic data from the first inner layer node comprises a comparison between a first derivative calculated with respect to a parameter of the first inner layer node of the first machine learning system for a current training iteration and a second derivative calculated with respect to the parameter of the first inner layer node of the first machine learning system for a prior training iteration of the first machine learning system.

14. The computer-implemented method of claim 1, wherein the second machine learning system comprises a second neural network.

15. The computer-implemented method of claim 14, wherein computing partial derivatives of the first objective function and computing partial derivatives of the second objective function each comprise performing a back propagation calculation.

16. The computer-implemented method of claim 1, wherein computing partial derivatives of the first objective function and computing partial derivatives of the second objective function each comprise performing a numerical estimation calculation.

17. The computer-implemented method of claim 1, wherein the internal characteristic of the first machine learning system is selected to cause the second machine learning system to alter an output of the first machine learning system when updating the learned parameters of the first machine learning system.

18. A computer system for analyzing training of a first machine learning system with a second machine learning system, the computer system comprising:

a processor; and a memory coupled to the processor, the memory storing:

the first machine learning system comprising a first objective function, wherein:

the first machine learning system comprises a first neural network;

the machine learning system comprises an input layer, an output layer, and one or more inner layers between the input and output layers;

each of the one or more layers comprises one or more nodes, such that the first machine learning system comprises at least a first inner layer node;

the second machine learning system comprising a second objective function, wherein:

the second objective function is for analyzing an internal characteristics of the first machine learning system; and the second objective function is different from the first objective function; and instructions that, when executed by the processor, cause the computer system to:

connect the first machine learning system to an input of the second machine learning system; and iteratively train the first machine learning system through multiple iterations by:

for each iteration providing a training data item to the first machine learning system;

collecting internal characteristic data from the first inner layer node of the first machine learning system associated with the internal characteristic of the first machine learning system for the training data item;
computing partial derivatives of the first objective function through the first machine learning system with respect to the training data item;
computing partial derivatives of the second objective function through both the second machine learning system and the first machine learning system with respect to the collected internal characteristic data for the training data item;
computing combined partial derivatives for the first machine learning system, wherein the combined partial derivatives comprise a combination of the partial derivatives of the first objective function through the first machine learning system for the training data item and the partial derivatives of the second objective function through the first machine learning system; and
after the multiple iterations:
computing accumulated partial derivatives for the first machine learning system, wherein the accumulated partial derivatives are computed from the combined partial derivatives for the first machine learning system across the training data items used in the multiple iterations; and
updating learned parameters of the first machine learning system based on the accumulated partial derivatives.

19. The computer system of claim 18, wherein the instructions cause the computer system to connect the first machine learning system to the second machine learning system by causing the computer system to:
add an additional output node to the first machine learning system; and
connect the additional output node to the input of the second machine learning system.

20. The computer system of claim 18, wherein the instructions cause the computer system to connect the first machine learning system to the second machine learning system by causing the computer system to:
connect an internal element of the first machine learning system to the input of the second machine learning system.

21. The computer system of claim 20, wherein the internal element comprises the first inner layer node of the neural network.

22. The computer system of claim 18, wherein the internal characteristic data comprises a latent variable.

23. The computer system of claim 22, wherein:
the latent variable comprises an activation value of the first inner layer node.

24. The computer system of claim 18, wherein the internal characteristic data comprises a derivative calculated with respect to a parameter of the first inner layer node of the first machine learning system.

25. The computer system of claim 24, wherein:
the derivative comprises a partial derivative of the first objective function with respect to an activation value of the first inner layer node.

26. The computer system of claim 24, wherein:
the derivative comprises a partial derivative of the first objective function with respect to an input to the first inner layer node.

27. The computer system of claim 24, wherein:
the neural network comprises a second node, and an arc from the second node to the first inner layer node; and
the derivative comprises a partial derivative of the first objective function with respect to a connection weight of the arc.

28. The computer system of claim 18, wherein the internal characteristic data comprises a satisfaction score sat(n) defined as:

$$sat(n)=sign(A(n)-0.5)*sign(-\delta(n)),$$

where A(n) is an output activation of the first inner layer node of the first machine learning system for the data item, wherein "sign" represents a sigmoid function.

29. The computer system of claim 18, wherein the internal characteristic data comprises a comparison between a first value of a latent variable for the first inner layer node for a current training iteration and a second value of the latent variable for the first inner layer node for a prior training iteration of the first machine learning system.

30. The computer system of claim 18, wherein the internal characteristic data comprises a comparison between a first derivative calculated with respect to a parameter of the first inner layer node of the first machine learning system for a current training iteration and a second derivative calculated with respect to the parameter of the first inner layer node of the machine learning system for a prior training iteration of the first machine learning system.

31. The computer system of claim 18, wherein the second machine learning system comprises a second neural network.

32. The computer system of claim 31, wherein the instructions cause the computer system to compute partial derivatives of the first objective function and compute partial derivatives of the second objective function via a back propagation calculation.

33. The computer system of claim 18, wherein the instructions cause the computer system to compute partial derivatives of the first objective function and compute partial derivatives of the second objective function via a numerical estimation calculation.

34. The computer system of claim 18, wherein the internal characteristic is selected to cause the second machine learning system to alter an output of the first machine learning system when updating the learned parameters of the first machine learning system.

35. A computer-implemented method for analyzing a first machine learning system via a second machine learning system, the first machine learning system comprising a first objective function, the method comprising:
connecting, by a computer system, the first machine learning system to an input of the second machine learning system, wherein the first machine learning system comprises a neural network comprising a plurality of output nodes;
wherein the second machine learning system comprises a second objective function for analyzing an internal characteristic of the first machine learning system;
providing, by the computer system, a data item to the first machine learning system;
collecting, by the computer system, internal characteristic data from the first machine learning system associated with the internal characteristic of the first machine learning system, wherein:
the internal characteristic data comprises a derivative calculated with respect to a parameter of the first machine learning system; and the derivative comprises a partial derivative of a difference between a largest activation and a second largest activation of the plurality of output nodes for the data item;
computing, by the computer system, partial derivatives of the first objective function through the first machine learning system with respect to the data item; and
computing, by the computer system, partial derivatives of the second objective function through both the second machine learning system and the first machine learning system with respect to the collected internal characteristic data.

36. A computer-implemented method for analyzing a first machine learning system via a second machine learning system, the first machine learning system comprising a first objective function, the method comprising:
connecting, by a computer system, the first machine learning system to an input of the second machine learning system;
wherein the second machine learning system comprises a second objective function for analyzing an internal characteristic of the first machine learning system;
providing, by the computer system, a data item to the first machine learning system;
collecting, by the computer system, internal characteristic data from the first machine learning system associated with the internal characteristic of the first machine learning system, wherein the internal characteristic data comprises a satisfaction score sat(n) defined as:

$sat(n)=sign(A(n)-0.5)*sign(-\delta(n))$, where A(n) is an output activation of a node n of the first machine learning system for the data item and sign represents a sigmoid function;
computing, by the computer system, partial derivatives of the first objective function through the first machine learning system with respect to the data item; and
computing, by the computer system, partial derivatives of the second objective function through both the second machine learning system and the first machine learning system with respect to the collected internal characteristic data.

37. A computer system for analyzing a first machine learning system via a second machine learning system, the computer system comprising:
a processor; and
a memory coupled to the processor, the memory storing:
the first machine learning system comprising a first objective function, wherein the first machine learning system comprises a neural network comprising a plurality of output nodes;
the second machine learning system comprising a second objective function; and
instructions that, when executed by the processor, cause the computer system to:
connect the first machine learning system to an input of the second machine learning system;
wherein the second objective function is for analyzing an internal characteristic of the first machine learning system;
provide a data item to the first machine learning system;
collect internal characteristic data from the first machine learning system associated with the internal characteristic of the first machine learning system, wherein:

the internal characteristic data comprises a derivative calculated with respect to a parameter of the first machine learning system; and
the derivative comprises a partial derivative of a difference between a largest activation and a second largest activation of the plurality of output nodes for the data item;
compute partial derivatives of the first objective function through the first machine learning system with respect to the data item; and
compute partial derivatives of the second objective function through both the second machine learning system and the first machine learning system with respect to the collected internal characteristic data.

38. A computer system for analyzing a first machine learning system via a second machine learning system, the computer system comprising:
a processor; and
a memory coupled to the processor, the memory storing:
the first machine learning system comprising a first objective function;
the second machine learning system comprising a second objective function; and
instructions that, when executed by the processor, cause the computer system to:
connect the first machine learning system to an input of the second machine learning system;
wherein the second objective function is for analyzing an internal characteristic of the first machine learning system;
provide a data item to the first machine learning system;
collect internal characteristic data from the first machine learning system associated with the internal characteristic of the first machine learning system, wherein the internal characteristic data comprise a satisfaction score sat(n) defined as:

$sat(n)=sign(A(n)-0.5)*sign(-\delta(n))$, where A(n) is an output activation of a node n of the first machine learning system for the data item and sign represents a sigmoid function;
compute partial derivatives of the first objective function through the first machine learning system with respect to the data item; and
compute partial derivatives of the second objective function through both the second machine learning system and the first machine learning system with respect to the collected internal characteristic data.

39. The method of claim 1, wherein the combined partial derivatives comprise a weighted average of the partial derivatives of the first objective function through the first machine learning system for the training data item and the partial derivatives of the second objective function through the first machine learning system.

40. The method of claim 39, wherein weighted average comprises:
the partial derivatives of the first objective function through the first machine learning system weighted by a first hyperparameter; and
the partial derivatives of the second objective function through the first machine learning system weighted by a second hyperparameter.

41. The computer system of claim 18, wherein the combined partial derivatives comprise a weighted average of the partial derivatives of the first objective function through the first machine learning system for the training data item and the partial derivatives of the second objective function through the first machine learning system.

42. The computer system of claim 41, wherein weighted average comprises:
- the partial derivatives of the first objective function through the first machine learning system weighted by a first hyperparameter; and
- the partial derivatives of the second objective function through the first machine learning system weighted by a second hyperparameter.

* * * * *